(12) United States Patent
Khadloya et al.

(10) Patent No.: US 11,735,018 B2
(45) Date of Patent: Aug. 22, 2023

(54) SECURITY SYSTEM WITH FACE RECOGNITION

(71) Applicant: INTELLIVISION TECHNOLOGIES CORP., San Jose, CA (US)

(72) Inventors: Krishna Khadloya, San Jose, CA (US); Albert Kay, San Mateo, CA (US)

(73) Assignee: INTELLIVISION TECHNOLOGIES CORP., San Jose, CA (US)

(*) Notice: Subject to any disclaimer, the term of this patent is extended or adjusted under 35 U.S.C. 154(b) by 0 days.

(21) Appl. No.: 16/299,000

(22) Filed: Mar. 11, 2019

(65) Prior Publication Data
US 2019/0278976 A1 Sep. 12, 2019

Related U.S. Application Data

(60) Provisional application No. 62/641,354, filed on Mar. 11, 2018.

(51) Int. Cl.
*G08B 13/196* (2006.01)
*G06V 40/16* (2022.01)
(Continued)

(52) U.S. Cl.
CPC ..... *G08B 13/19615* (2013.01); *G06F 18/217* (2023.01); *G06V 10/446* (2022.01);
(Continued)

(58) Field of Classification Search
CPC ........... G06K 9/00288; G06K 9/00771; G06K 9/00926; G06K 9/6262; G08B 13/19656;
(Continued)

(56) References Cited

U.S. PATENT DOCUMENTS

| | | |
|---|---|---|
| 6,681,032 B2 | 1/2004 | Bortolussi et al. |
| 7,634,662 B2 | 12/2009 | Monroe |

(Continued)

FOREIGN PATENT DOCUMENTS

| | | |
|---|---|---|
| CN | 201213285 Y | 3/2009 |
| CN | 201965714 U | 9/2011 |

(Continued)

OTHER PUBLICATIONS

"Camera Based Face Recognition", Asis Elektronik, [Online] Retrieved from the internet on Jun. 11, 2019: <URL: https://www.asiselektronik.com.tr/en/camera-based-face-recognition>, (2018), 4 pgs.

(Continued)

*Primary Examiner* — Maria E Vazquez Colon
(74) *Attorney, Agent, or Firm* — Schwegman Lundberg & Woessner, P.A.

(57) ABSTRACT

An intelligent face recognition system for an installed security system can include a camera and a local or remote video processor including a face recognition engine. The video processor can be configured to receive the image information from the one or more cameras, and generate an alert for communication to a user device based on a recognition event in the environment. In an example, the face recognition engine is configured to apply machine learning to analyze images from the camera and determine whether the images include or correspond to an enrolled face, and the face recognition engine is configured to provide the recognition event based on the determination.

19 Claims, 5 Drawing Sheets

(51) Int. Cl.
*G06V 20/52* (2022.01)
*G06V 40/50* (2022.01)
*G06F 18/21* (2023.01)
*G06V 10/764* (2022.01)
*G06V 10/44* (2022.01)
*G06T 7/20* (2017.01)

(52) U.S. Cl.
CPC .......... *G06V 10/454* (2022.01); *G06V 10/764* (2022.01); *G06V 20/52* (2022.01); *G06V 40/165* (2022.01); *G06V 40/171* (2022.01); *G06V 40/172* (2022.01); *G06V 40/50* (2022.01); *G08B 13/19656* (2013.01); *G06T 7/20* (2013.01); *G06T 2207/20081* (2013.01); *G06T 2207/20084* (2013.01); *G06T 2207/30201* (2013.01); *G06T 2207/30232* (2013.01)

(58) Field of Classification Search
CPC .. G08B 13/194; G08B 13/19615; G06T 7/20; G06T 2207/20081; G06T 2207/20084; G06T 2207/30201; G06T 2207/30232; G06V 10/446; G06V 10/454; G06V 10/764; G06V 20/52; G06V 40/165; G06V 40/171; G06V 40/172; G06V 40/50
See application file for complete search history.

(56) References Cited

U.S. PATENT DOCUMENTS

| | | | |
|---|---|---|---|
| 7,847,820 | B2 | 12/2010 | Vallone et al. |
| 8,358,811 | B2 | 1/2013 | Adams et al. |
| 9,405,960 | B2 | 8/2016 | Yin et al. |
| 9,508,250 | B2 | 11/2016 | Malhotra et al. |
| 9,953,514 | B2 | 4/2018 | Fadell et al. |
| 10,117,309 | B1 | 10/2018 | Fu et al. |
| 2004/0117638 | A1* | 6/2004 | Monroe ............... G08B 25/016 713/186 |
| 2005/0237187 | A1 | 10/2005 | Martin |
| 2006/0190419 | A1 | 8/2006 | Bunn et al. |
| 2007/0288748 | A1* | 12/2007 | Kakiuchi ............. G06F 21/316 713/159 |
| 2007/0291118 | A1 | 12/2007 | Shu et al. |
| 2009/0196464 | A1 | 8/2009 | Dimitrova et al. |
| 2015/0262024 | A1* | 9/2015 | Braithwaite ......... G06K 9/2036 382/118 |
| 2016/0311646 | A1* | 10/2016 | Bryant ................. B66B 1/468 |
| 2017/0140376 | A1 | 5/2017 | Carraway et al. |
| 2017/0294091 | A1 | 10/2017 | Min et al. |
| 2017/0351907 | A1* | 12/2017 | Bataller ............... G06V 40/173 |
| 2018/0047267 | A1* | 2/2018 | Modestine ............ G06T 7/246 |
| 2018/0181737 | A1* | 6/2018 | Tussy ................... G06F 21/32 |
| 2019/0051128 | A1* | 2/2019 | Yamashiro ............ G07C 9/257 |
| 2019/0066470 | A1* | 2/2019 | Jeon ................ G08B 13/19663 |
| 2019/0066471 | A1* | 2/2019 | Jeon ........................ G08B 1/08 |
| 2019/0108735 | A1* | 4/2019 | Xu .................. G08B 13/19695 |
| 2019/0138795 | A1* | 5/2019 | Vaidya ............ G08B 13/19695 |
| 2019/0149543 | A1* | 5/2019 | Chen .................. H04L 63/0861 726/7 |
| 2019/0304274 | A1* | 10/2019 | Britton ..................... G07C 9/25 |

FOREIGN PATENT DOCUMENTS

| | | |
|---|---|---|
| CN | 104346607 A | 11/2014 |
| CN | 103281223 B | 5/2016 |
| CN | 106331602 A | 1/2017 |
| CN | 106372576 A | 2/2017 |
| CN | 107066942 A | 8/2017 |
| CN | 107430679 A | 12/2017 |
| CN | 107609512 A | 1/2018 |
| CN | 108540762 A | 9/2018 |
| EP | 2306367 A1 | 4/2011 |
| EP | 3189502 A1 | 7/2017 |
| JP | 4743566 B2 | 5/2011 |
| WO | WO-2014139415 A1 | 9/2014 |

OTHER PUBLICATIONS

"Identification Management Solutions", iView Systems, [Online] Retrieved from the internet: <URL: https://www.iviewsystems.com/identification-management>, (accessed Jun. 11, 2019), 4 pgs.

"Nest Cam Indoor—Overview", Nest Labs, [Online] Retrieved from the internet: <URL: https://nest.com/cameras/nest-cam-indoor/overview/>, (accessed Jun. 11, 2019), 10 pgs.

"Smart Home Security System", SEQ Security Surveillance Service Inc., [Online] Retrieved from the internet: <URL: http://www.seqsecurity.com/security-products/cctv-surveillance-products/smart-home-security-system-toronto/>, (accessed Jun. 11, 2019), 9 pgs.

"Smart Indoor Security Camera", Netatmo, [Online] Retrieved from the internet: <URL: https://www.netatmo.com/en-us/security/cam-indoor>, (accessed Jun. 11, 2019), 10 pgs.

"SmartCam N2", Wisenet, [Online] Retrieved from the internet: <URL: https://www.wisenetlife.com/en/product/SmartCam/SNH-P6416BN/faq/?currtPg=1>, (accessed Jun. 11, 2019), 19 pgs.

Aiman, Umme, et al., "Face Recognitian Using Modified Deep Learning Neural Network", 8th Intl. Conference on Computing, Communication and Networking Technologies (ICCCNT), Delhi, India, (2017), 5 pgs.

Bashbaghi, Saman, et al., "Deep Learning Architectures for Face Recognition in Video Surveillance", arXiv:1802.09990v2 [cs.CV], (Jun. 27, 2018), 21 pgs.

Delac, Kresimir, et al., "Face Recognition", I-TECH Education and Pubiishing, Vienna, Austria, (Jun. 2007), 570 pgs.

Estrada, Maren, "There's a home security camera with advanced facial recognition, and it's on sale for 47 dollars", BGR Media, [Online] Retrieved from the internet on Jun. 11, 2019: <URL: https://bgr.com/2018/08/13/home-security-camera-with-facial-recognition-amazon/>, (Aug. 13, 2018), 2 pgs.

Ferdous, Shariful Islam, et al., "Literature Survey of Automatic Face Recognition System and Eigenface Based Implementation", Thesis at BRAC University, Bangladesh, 69 pgs.

Ichano, "AtHome Camera—phone as remote monitor", Google Play Apps, [Online] Retrieved from the internet: <URL: https://play.google.com/store/apps/details?id=com.ichano.athome.camera&hl=en>, (accessed Jun. 11, 2019), 4 pgs.

Metz, Rachel, et al., "Using Deep Learning to Make Video Surveillance Smarter", MIT Technology Review Online, [Online] Retrieved from the internet on Feb. 4, 2019: <URL: https://www.technologyreview.com/s/540396/using-deep-learning-to-make-video-surveillance-smarter/>, (Aug. 17, 2015), 3 pgs.

Mou, Dengpan, "Autonomous Face Recognition", Dissertation at Ulm University, Germany, (Aug. 2005), 109 pgs.

Nader, Ben, "Facial Recognition Part of Home Security", Ooma, Inc., [Online] Retrieved from the internet on Jun. 11, 2019: <URL: https://www.ooma.com/blog/facial-recognition-part-of-home-security/>, (Apr. 12, 2018), 6 pgs.

Nellis, Stephen, "Home Security Camera's Face Recognition Even Knows Family Dog", Reuters, [Online] Retrieved from the internet on Jun. 11, 2019: <URL: https://www.insurancejournal.com/news/national/2018/02/23/481431.htm>, (Feb. 23, 2018), 1 pg.

Ozhiganov, Ivan, "Developing a Face Recognition System Using Convolutional Neural Network", Azoft, [Online] Retrieved from the internet on Jun. 11, 2019: <URL: https://www.azoft.com/blog/face-recognition-via-cnn/>, (May 14, 2017), 9 pgs.

Pao, William, "Applying deep learning to facial recognition cameras", Messe Frankfurt New Era Business Media Ltd, [Online] Retrieved from the internet on Jun. 11, 2019: <URL: https://www.asmag.com/showpost/24600.aspx>, (Feb. 21, 2018), 3 pgs.

Rasti, Pejman, et al., "Convolutional Neural Network Super Resolution for Face Recognition in Surveillance Monitoring", Proc. of the Intl. Conference on Articulated Motion and Deformable Objects (AMDO), (Jul. 2, 2016), 175-184.

(56) References Cited

OTHER PUBLICATIONS

Santemiz, Pinar, et al., "Video-based Side-view Face Recognition for Home Safety", 33rd WIC Symposium on Information Theory in the Benelux, Boekelo, the Netherlands, (2012), 8 pgs.

Wollerton, Megan, "ArcSoft brings face recognition to Simplicam at CES 2015", CNET, [Online] Retrieved from the internet on Jun. 11, 2019: <URL: https://www.cnet.com/news/arcsoft-brings-face-recognition-to-simplicam-at-ces-2015/>, (Jan. 6, 2015), 3 pgs.

* cited by examiner

SECURITY SYSTEM WITH FACE RECOGNITION

CLAIM OF PRIORITY

This patent application claims the benefit of priority of U.S. Provisional Patent Application Ser. No. 62/641,354, entitled "System and Method for Intelligent Face Recognition in the Context of Home Security Monitoring", filed on Mar. 11, 2018, which is incorporated by reference herein in its entirety.

BACKGROUND

Video cameras, including webcams, mobile device-based cameras, closed-circuit or security cameras, or other edge-based devices, sensors, and other devices are prevalent in society. Internet or server-based systems can receive or use data from such cameras. In an example, machine vision technology can be used to process image data from cameras and determine whether specific objects exist in an environment monitored by a camera.

In an example, a camera system can be configured to detect motion using image data. In some cases, camera data is uploaded to a central server or processor that is configured to provide information about motion or configured to identify one or more objects in the environment. With Internet technology, it is feasible to provide web services that can automatically scale upon user demand, such as using various types of automated service provisioning methods and virtual machine migration methods, such as can be used to process image data received from remote sources.

Safety and security in home, office, and other settings is increasingly a concern for individuals, business owners, municipalities, and others. In addition, with increases in business and leisure travel, people may leave homes or businesses unoccupied or unattended for longer periods of time, which can be inviting to thieves. Various tools are available to help mitigate potential losses, such as security systems with window and door sensors, motion sensors, surveillance systems, access control systems, smart home systems, and the like. Some security systems include or use video surveillance, such as using video cameras that can be deployed indoors or outdoors. Such video or image-based systems can reside locally, with cameras and recording media stored locally. In an example, other systems can be distributed with image capture or camera devices locally deployed and storage or processing located remotely. In an example, image or video information from a security system is stored in the cloud.

In some security systems equipped with one or more cameras, users can access image or video information on-demand, or a system can be configured to record or store video information continuously or selectively. For example, a security system can be configured to record video information when the same or other sensor detects movement in the monitored area. Depending on factors such as a camera location and environment, a motion-based event generation system can generate hundreds of events per day. As a number of events grows, it can be difficult for a user to process the resulting volume of event information made available by the system.

OVERVIEW

An intelligent face recognition system and method can be used for smart environment monitoring. One or more cameras can send image information to a video management server (VMS) for facial recognition processing. In an example, a camera can include an embedded face recognition engine that can be used to provide face recognition event information and image information to the VMS. The VMS can provide an interface for a user to access camera functions or data and the VMS can perform alerting functions for the user. In an example, the VMS can send image information to a face recognition engine for post-processing of image or event data. The facial recognition engine can be configured to run inside a camera or a visual sensor, and the engine can be combined with various sensors and operated according to user-specified rules to provide a high level of personalization, monitoring, and control.

In an example, a server-based face recognition engine can receive information from a camera or from the VMS, perform facial recognition, and then report recognition results to the VMS. In turn, the VMS can be configured to notify a user. In an example, the user notification includes a prompt or suggestion to the user to watch a feed from one or more cameras, to enroll a user into the face recognition database, to display alerts or other information about actual or potential events, or playback videos.

In an example, the systems and methods discussed herein provide a distributed workflow or processing environment that leverages functions of edge devices, such as cameras or other sensors, and leverages functions available in a cloud computing environment. For example, the present inventors have recognized that a solution to the problem of enhancing accuracy of event detection and minimizing false positives includes or uses a face recognition engine to help discern which events to record or to present to a user.

In an example, the present subject matter includes or uses an intelligent face recognition system for smart home security monitoring. The system can include one or more video cameras connected to either a cloud or local server or management system. In an example, each camera can include or use a deep learning-based face detection engine or face recognition engine, and thus each camera can generate event information based on rules substantially in real time. The deep learning-based face detection engine or face recognition engine can additionally or alternative operate on a local server, a remote server, or a cloud server. In an example, camera-generated event information can be communicated to a cloud environment and the cloud environment can respond with user notification, data archiving, or other action.

In an example, the present subject matter includes or uses a system that includes one or more cameras connected to a cloud or local server or management system where face detection and recognition processing is applied and natural language-based rules are applied to determine event generation and notification workflow. In an example, the natural language rules are defined in the system using voice commands or a user interface with phrases as the separators.

In an example, a face recognition engine can be initialized with known-good or known-bad facial information. For example, the face recognition engine can be configured to recognize faces belonging to a particular user or group of users, family members, friends, or others as directed by a primary or system-governing user. In an example, facial capture can include or use multiple images or video information for each enrolled face. Events generated as a result of processing rules in real time can be pushed to users who can see information about the events such as using a mobile application, email, or other simple and easy-to-use interface.

Aspect 1 can include or use subject matter (such as an apparatus, a system, a device, a method, a means for performing acts, or a device readable medium including instructions that, when performed by the device, can cause the device to perform acts, or an article of manufacture), such as can include or use an intelligent face recognition system for an installed security system, smart home or smart office system, monitoring system, surveillance system, or other system that can benefit from or use face recognition to augment or enhance one or more aspects thereof. In an example, the face recognition system of Aspect 1 can include one or more cameras configured to provide image information about an environment and a local or remote video processor including a face recognition engine. The video processor can be configured to receive the image information from the one or more cameras, and generate an alert for communication to a user device based on a recognition event in the environment. In Aspect 1, the face recognition engine can be configured to apply machine learning to analyze the image information from the camera and determine whether the image information includes or corresponds to an enrolled face, and wherein the face recognition engine is configured to provide the recognition event based on the determination.

Aspect 2 can include or use, or can optionally be combined with the subject matter of Aspect 1, to optionally include a user device configured to execute a client application that communicates with the video processor, and wherein the user device includes a user interface that can display information about the recognition event.

Aspect 3 can include or use, or can optionally be combined with the subject matter of Aspect 2, to optionally include the user device being configured to acquire face imagery and communicate the imagery to the video processor to enroll new faces with the system.

Aspect 4 can include or use, or can optionally be combined with the subject matter of Aspect 2, to optionally include the user device being configured to display, to a user, real-time video information from the one or more cameras in response to the recognition event.

Aspect 5 can include or use, or can optionally be combined with the subject matter of Aspect 2, to optionally include the user device being configured to display, to a user and in response to a request from the user, an image used by the video processor in generating the alert based on the recognition event.

Aspect 6 can include or use, or can optionally be combined with the subject matter of one or any combination of Aspects 1 through 5 to optionally include the face recognition engine being configured to apply the machine learning to analyze the image information from the camera in response to a motion event detected using information from the same one or more cameras or from a different motion sensor.

Aspect 7 can include or use, or can optionally be combined with the subject matter of one or any combination of Aspects 1 through 6 to optionally include an indoor/outdoor camera apparatus comprising the one or more cameras and the video processor including the face recognition engine. In other words, in Aspect 7, the camera and the video processor can be integrated into a common hardware device.

Aspect 8 can include or use, or can optionally be combined with the subject matter of one or any combination of Aspects 1 through 7 to optionally include the video processor being configured to generate the alert based on the recognition event and based on an environment change as indicated by information from another sensor or device, including one or more of a motion sensor, a thermostat, a fire alarm, a smoke alarm, an access control device, an acoustic sensor, a doorbell, a relay, or a smart speaker.

Aspect 9 can include or use, or can optionally be combined with the subject matter of one or any combination of Aspects 1 through 8 to optionally include the face recognition engine including a condition-based face detector that is configured to use respective threshold conditions for different facial feature detectors to expedite analysis and reduce a number of false positive results.

Aspect 10 can include, or can optionally be combined with the subject matter of one or any combination of Aspects 1 through 9 to include or use, subject matter (such as an apparatus, a method, a means for performing acts, or a machine readable medium including instructions that, when performed by the machine, that can cause the machine to perform acts), such as can include or use a machine learning-based image recognition system for determining when a particular human being is present in or absent from an environment and reporting information about an occupancy of the environment over time. In an example, the system of Aspect 10 can include an image receiver configured to receive a series of image frames of the environment, wherein each of the image frames is acquired at a different time, and a neural network-based face recognition processor circuit. The neural network-based face recognition processor circuit can be configured to access a database of facial features corresponding to enrolled individuals, determine whether a candidate face is present in the image frames from the image receiver, and when the candidate face is determined to be present in at least one of the image frames, identify whether the candidate face corresponds to one of the enrolled individuals, and generate an alert, for communication to a user, about whether the candidate face corresponds to one of the enrolled individuals.

Aspect 11 can include or use, or can optionally be combined with the subject matter of Aspect 10, to optionally include an indoor/outdoor camera device that includes the image receiver and the neural network-based face recognition processor circuit.

Aspect 12 can include or use, or can optionally be combined with the subject matter of one or any combination of Aspects 10 or 11 to optionally include a remote user interface device configured to receive the alert and, based on a user response to the alert, provide information to the user about the candidate face or about an enrolled individual corresponding to the candidate face.

Aspect 13 can include or use, or can optionally be combined with the subject matter of one or any combination of Aspects 10 through 12 to optionally include the image receiver including a camera, such as a 2D or 3D camera, that comprises a portion of a home or office security system.

Aspect 14 can include or use, or can optionally be combined with the subject matter of one or any combination of Aspects 10 through 13 to optionally include a non-camera sensor or non-visual sensor configured to sense information about the environment, and wherein the image receiver is configured to receive the series of image frames of the environment when the information from the non-camera sensor indicates a deviation from a learned or specified normal environment condition.

Aspect 15 can include or use, or can optionally be combined with the subject matter of Aspect 14, to optionally include the non-camera sensor including a motion sensor, and wherein the image receiver is configured to receive the series of image frames of the environment when the motion sensor indicates motion is detected in the environment, and wherein the system includes a processor circuit configured to determine the deviation from the normal environment condition by automatically learning about events in the environment over time.

Aspect 16 can include, or can optionally be combined with the subject matter of one or any combination of Aspects 1 through 15 to include or use, subject matter (such as an apparatus, a method, a means for performing acts, or a machine readable medium including instructions that, when performed by the machine, that can cause the machine to perform acts), such as can include or use a method for performing facial recognition using a local or distributed processing system. In an example, Aspect 16 can include receiving candidate face information from a camera, providing the candidate face information to a neural network-based face recognition processor, accessing a database of facial features corresponding to enrolled individuals, determining whether the candidate face information corresponds to one of the enrolled individuals, and generating an alert, for communication to a user, about whether the candidate face information corresponds to one of the enrolled individuals.

Aspect 17 can include or use, or can optionally be combined with the subject matter of Aspect 16, to optionally include determining whether the candidate face information corresponds to one of the enrolled individuals including using the candidate face information as an input to a convolutional neural network that is trained on the database of facial features corresponding to the enrolled individuals.

Aspect 18 can include or use, or can optionally be combined with the subject matter of Aspect 17, to optionally include receiving training information for the neural network from a user input in response to the generated alert, the training information including an indication from the user about a validity of the alert.

Aspect 19 can include or use, or can optionally be combined with the subject matter of one or any combination of Aspects 16 through 18 to optionally include receiving, from a user, rules governing notification of the user in response to different types of alerts, and determining whether the generated alert conforms to a rule established by the user before communicating a notification to the user about the alert.

Aspect 20 can include or use, or can optionally be combined with the subject matter of one or any combination of Aspects 16 through 19 to optionally include enrolling a first individual and storing facial features corresponding to the first individual in the database, wherein enrolling the first individual includes using a user device that is configured to receive information about the generated alert.

Each of these non-limiting Aspects or examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

Figure 1:
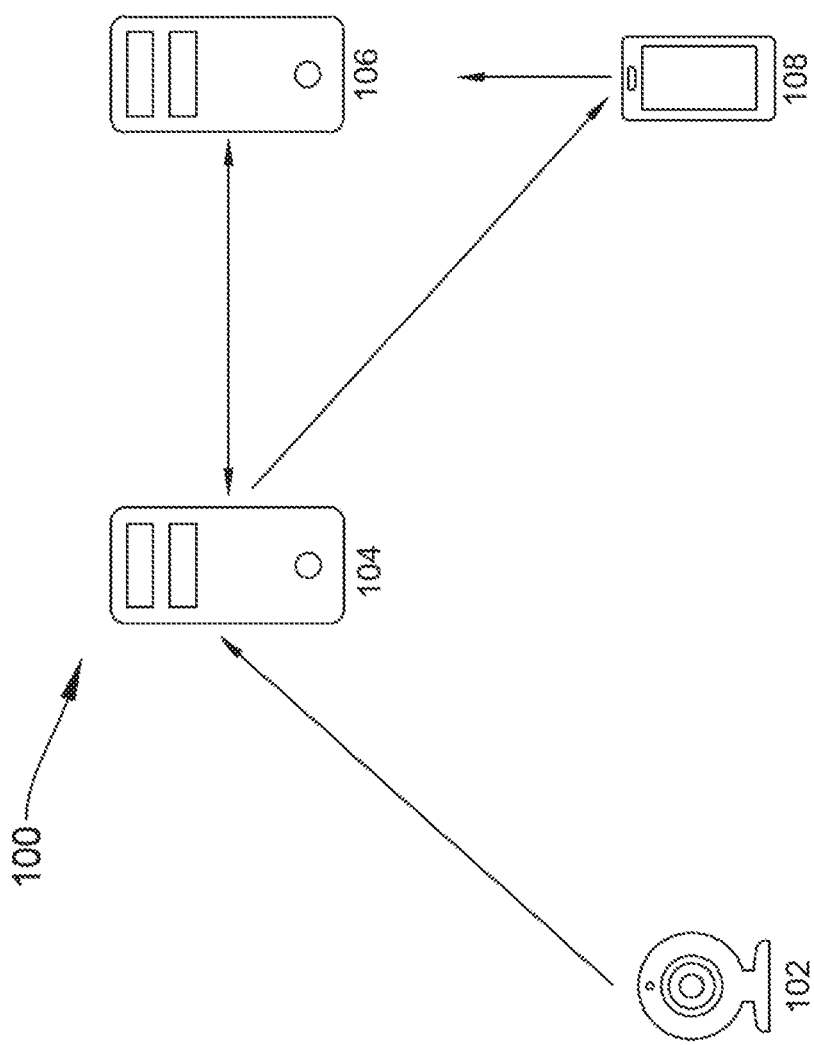
FIG. 1 illustrates generally an example of a system that can be used to receive and process image information.

This detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Various algorithms can be employed by computers (devices, machines, systems, etc.) to automatically and accurately detect human bodies in images and/or videos. In an example, deformable part-based models of Histogram of Oriented Gradients (HOG) features, such as combined with latent Support Vector Machines (SVM) techniques, can be used to detect one or more individuals or human bodies in an image. Part-based human detection can be used to localize various body parts of an individual in an image. In an example, part-based detection uses root filters and part filters.

In an example, human detection using machines to analyze images includes model training and detection. Training can be an offline step where machine learning algorithms (such as a convolutional neural network, or CNN) are trained on a training data set to learn human and non-human forms or facial features from various images. Detection can use one or more machine learning models to classify human and non-human regions in an image or frame. In an example, the detection is performed using a pre-processing step of identifying potential regions for presence of a human and a post-processing step of validating the identified potential regions. In the detection step, part-based detectors can be used in the identified region(s) by a root filter such as to localize, or provide information about a location of, each human part.

In an example, filters and deformable part-based models or algorithms can be used together to model a human appearance more accurately and in a more robust manner. Various examples of the filters can include HoG or HoG-like filters. Models can be trained by a latent SVM formulation where latent variables usually specify an object of interest (e.g., a human, or a portion of a human such as a face or head), such as including relative geometric positions of parts of a human.

In an example, a root filter can be trained for an entire human body and part filters can be separately trained within regions of different root filters using latent SVM techniques. In an example, a model includes root filters that cover the target object and part models that cover smaller parts of the target object. The part models in turn include their respective filters, relative locations and a deformation cost function. To detect a human face in an image, an overall score can be computed for each root location, and higher relative score locations can be considered as candidate locations for the human face or facial features.

FIG. 1 illustrates generally an example of a system that can be used to receive and process image information. FIG. 1 includes a face recognition system 100 including components and architecture that can be used, for example, in smart home security. The same or similar components can be used in other environments, such as in an office or in a public environment. In an example, the face recognition system 100 includes one or more components that provide a machine learning-based image recognition systems, such as can use a neural network-based classifier and classifier models to perform facial recognition on received images.

The system 100 can include a video camera 102, a server such as a local server 104 and/or a remote server 106, and a user device 108. In an example, the video camera 102 is configured to receive or capture still images or video information, and can optionally be configured as a portion of a real-time streaming system. The system 100 can include one or more servers that receive information from the video camera 102. In an example, the local server 104 and/or the remote server 106 include a video management server, or VMS, or video cloud backend server. One or more of the camera 102, the local server 104, the remote server 106, and the user device 108 can include or use a face recognition engine.

In an example, the video camera 102 includes multiple cameras, such as can be installed in the same location or different locations. Examples of such locations include, but are not limited to, homes, roads, parking spaces, garages, toll booths, outside residential areas, outside office spaces, outside public places (such as malls, recreational areas, museums, libraries, hospitals, police stations, fire stations, schools, colleges), and the like. The camera 102 can include a Closed-Circuit Television (CCTVs) camera, High Definition (HD) camera, non-HD camera, handheld camera, or any other video/image receiving unit.

In an example, the local server 104 and/or the remote server 106 is configured to receive dynamic imagery or video footage from the camera 102. In an example, the server can maintain the dynamic imagery or video footage as received from the camera 102. In an example, the camera 102 can have respective fixed fields of view or can be movable. In an example, the camera 102 includes a camera with a 180 degree view sensor and the camera is mounted on a ceiling or wall. Images acquired by such a camera can be de-warped such as prior to further processing. Other 180 degree view or more limited field of view sensors can similarly be used.

In an example, a face detection engine can be operable at the camera 102 or at one or both of the local server 104 and the remote server 106. In an example, a face detection engine can be operable at the user device 108, such as using a device application, web browser, or other function of the device.

In an example, video or image information from the camera 102 is processed to detect faces either continuously (e.g., all the time) or in response to a trigger event, such as when a motion event is detected. In an example, the camera 102 is configured to capture or record video from the environment and can be configured to stream substantially live video to a user for viewing either locally or remotely.

In an example, the camera 102 can be configured to have embedded triggers for motion detection, human detection, or human or other object recognition. That is, a module or function of the camera 102 can be or can include image analysis to determine if motion exists in the environment (e.g., by comparing changes in pixel information from a series of frames acquired by the camera 102, or can include image analysis to determine if a human form, or a particular human or other object, is present in the field of view of the camera 102. In response to motion or a positive identification or a human or other object, the camera 102 can generate an event indication that can, among other things, cause video information corresponding to the event to be recorded or displayed to the user.

In an example, the camera 102 includes a video processor that is configured to analyze images received by the camera to determine whether the images include a recognized face (e.g., a face of an enrolled individual. If a face is detected or recognized, then the camera can generate an event indication and report the event to a user, such as together with video or image information about the event.

In an example, the system 100 is configured for set up and initialization by a user. The user can register and connect the camera 102 to the local server 104 and/or to the remote server 106. Once registered, the camera 102 can be configured to stream live video, record image metadata, and record or report trigger event information, such as including video information recorded concurrently or subsequently to the trigger event. In an example, the local server 104 and/or the remote server 106 is configured to query the user to define image parameters, video parameters, event triggers, alerts, and a rules engine. The rules engine can be configured to enable the user to specify complex scenarios that produce a trigger or event notification.

In an example, the camera 102 can include a video or image processor circuit that is configured to receive image information and identify a triggering event, such as by performing face recognition to determine whether an enrolled or unenrolled individual is present in an environment. In an example, the camera 102 includes a video or image processor circuit that is configured to trigger an event for storage and/or streaming, such as without performing face recognition. In an example, in response to a trigger for an event, the local server 104 and/or the remote server 106 can be configured to receive image information from the camera 102 for concurrent or subsequent additional processing, such as to determine whether a known face is detected or recognized. When a face is detected or recognized, the event information can be updated in server to reflect this as part of the event, such as using metadata associated with the video or other data associated with the event.

After the face is detected or recognized, the server can make available, or can communicate to the user, information about the event and/or about the detected face. In an example, the server can provide the user device 108 an alert such as using a push notification, email, SMS (Short messaging service), etc., such as whenever particular events are created or whether pre-defined rules are triggered.

In an example, a face recognition module is a software-implemented module that is executed at one or more of the camera 102, the local server 104, the remote server 106, or the user device 108. In an example, a mobile or web application executed on the user device 108 can be configured to capture a video or image and send the corresponding data to a face recognition engine for enrollment. As part of this enrollment process, the user can create an entity in the system 100 by providing attributes of the person in the captured video or image, such as the person's name, relationship, group, or other information uniquely identifying the person. The user can manage and maintain the person details and trained images through the face recognition engine. Any image or video that is passed into the face recognition engine, such as from the camera 102, can be processed to determine whether a face is detected and whether it matches an enrolled person. If an enrolled face is detected, then the face recognition engine can return the attributes associated with that person, such as together with a time stamp, person name, confidence level, bounding box location of the face, or a frame number. If a face is detected but not determined to be part of the enrolled list of users, then the face recognition engine can return an unknown face detected event, such as together with the time stamp, bounding box, location of the face, or the frame number of the face found in the video. Any or all of these attributes can be passed to the local server 104 and/or to the remote server 106 for storage, retrieval, or further processing.

In an example, the system 100 can be part of at least one of a surveillance system, a security system, a traffic monitoring system, a home security system, a toll fee system or the like. At least one of the camera 102, the local server 104, and the remote server 106 can include a processor circuit configured to perform facial recognition using image or video information from the camera 102 or from another image capture device or from a database or other source. The information can be in form of one or more video streams and/or one or more images or frames. If the data is in the in the form of video streams, then the processor circuit can convert each stream into a plurality of static images or frames before processing. If the data is in the form of image sequences, then the processor circuit can processes the image sequences and generate an output that can include information about, among other things, whether a person or individual was detected in the environment, activities occurring in the environment, an identification or characteristic of the person or individual, such as based on information resulting from a facial recognition process, or other information about what one or more objects that are determined to be present in or absent from the environment.

In an example, the systems and methods discussed herein can include or use other sensors at the edge, such as can be communicatively coupled with one or more components of the system 100. Such a sensor can be configured to sense information about the environment in which it is deployed to detect deviations from a normal condition or to detect changes that exceed some specified threshold condition. In an example, a machine learning-based system can be used to monitor sensor data to establish normal conditions over time. The sensors can include, for example, (i) a PIR motion sensor, (ii) a thermostat, (iii) a fire or smoke alarm sensor, (iv) an access control device or card reader, (v) a door or entryway sensor, (vi) a garage or gate sensor, (vii) an acoustic sensor, (viii) a smart speaker, or others. In an example, such edge devices may not include an integrated or embedded camera or image sensor. However, the present systems can be used to augment such edge devices. For example, a camera (e.g., the camera 102) and an image processor (e.g., embedded with the camera 102, or provided at the local server 104, the remote server 106, and/or the user device 108) can be added or communicatively coupled to an edge device. The camera 102 can capture images or videos at or near the edge device. In an example, camera activity or image sensing or recording can be triggered or initiated in response to information detected in an image or by an alert or other indication from another sensor.

In an example, a PIR motion sensor can sense motion or activity. Upon positive identification of the motion or activity, the PIR sensor can send a signal to the camera 102 to begin receiving or recording images or video. The images or video can be processed, such as inside the camera 102 itself, to determine whether a particular enrolled person is present in or absent from the scene.

In an example, events, actions, environmental changes, or other information sensed from non-visual sensors can be received and processed by the system 100. In an example, the sensor information can be aggregated at a monitoring device or security panel such as installed on premise or located remotely in the cloud, such as to trigger video recording or face capture. Some examples of non-visual triggers, events, actions, or environmental changes can include but are not limited to doorbell button pushes, door or gate open triggers, other external relay triggers, smoke or fire alarm triggers, acoustic information or events, temperature triggers, and others. In an example, a notification generated for a user of the user device 108 can include information from or about the non-visual sensors, such as can be provided together with visual image or video information from the camera 102.

In an example, the system 100 can be configured to receive a trigger event, such as indicated by a visual or non-visual sensor, and perform some responsive action. In an example, the responsive action can be selected to augment or enhance a face recognition process. For example, in response to a trigger event, the system 100 can cause lights to turn on in a designated monitored area. In an example, the lights can enhance image capture by the camera 102 and thus facilitate facial recognition processing or reporting to the user.

In an example, audio communication can be established between the monitored environment and another location, such as when a particular person is detected in the environment using the facial recognition functions of the system 100. In an example, the other location can include a monitoring station, or a location corresponding to a user of the user device 108, or elsewhere. The audio communication can be used to communicate information to the particular person such as to provide a verbal warning or to establish a call between the particular person and an emergency responder (e.g., 911 operator) or call center personnel. In an example, pre-recorded audio clips can be played in the environment (e.g., using a speaker embedded with the camera 102 or using another playback device), such as when the particular person corresponds to an enrolled or unenrolled individual. In an example, the pre-recorded audio clips can be specified or provided by user-defined rules applied by the system 100 in response to detection events, as discussed elsewhere herein.

In an example, in response to a trigger event, audio communication can be established between the monitored environment and the user. In an example, the audio communication can be established when a face is detected but not recognized, such as can signify that a real person is detected in the monitored environment. In an example, the face detection can be based on a liveliness check to ensure that there is a real person in the scene.

In an example, a processor circuit can be provided outside of a sensor. In this case, image or video information from the camera can be transmitted to the processor circuit for analysis, such as to determine whether a particular human being is recognized in a scene. In an example, such a processor circuit can be provided in or in communication with a home security panel or controller such as can be located remotely from the sensor such as in a different home or building.

In an example, an edge device-based facial recognition system can be configured to provide various information. For example, a result of a facial recognition algorithm can be that (i) one or more recognized or enrolled individuals are detected to be present in a scene, or (ii) one or more unrecognized or unenrolled individuals are detected to be present in the scene, or (iii) some individuals in the scene are recognized or enrolled and some are not, or (iv) some individuals are determined to be present in the scene but the system 100 has a relatively low confidence that at least one of the individuals corresponds to a recognized or enrolled individual. Information about the recognized or enrolled individuals, such as names or other characteristics can be determined and stored, communicated to a user, or otherwise used.

In an example, a face recognition engine is configured to process one or more received images (or frames of video data) and execute various algorithms for detecting a presence of a human face, identifying features of the human face, and then providing an indication of whether the features correspond to an enrolled individual. In an example, the face recognition engine first processes each of one or multiple received images to identify one or more regions that are likely to include a human face or that include candidate faces or candidate facial features. Next, the face recognition engine can identify facial feature relationships and calculate an overall score based on one or more scores associated with the features. The overall score can correspond to a confidence that a particular known or enrolled human or individual is identified in the scene, as opposed to another human or a non-human object. While performing facial recognition, the processor circuit can be configured to consider occlusion, illumination or other conditions.

In an example, the user device 108 can include a mobile or desktop application or web interface. A user can use the user device 108 to get reports about the system 100, such as including configuration information, enrollment information, or archived event information, or live image or video feed information. In an example, the interface can include or display a timeline of events including an indication of when one or more enrolled individuals were visible, such as on a specified date or date range. For example, a user can request reports like "show when my gardener or housekeeper was present in the field of view of the camera in the last week", or "show when my daughter arrived or departed from the house yesterday", or "show a timeline of events when any member of a specified group is detected", and so on.

In an example, the user device 108 can be used to establish two-way or one-way communication between the user and the environment that includes the camera 102. For example, a user can use the user device 108 to begin a conversation with an unknown person in the field of view of the camera 102, for example using cloud connectivity to initiate the communication between the mobile application of the user device 108 on one end and the camera 102 at the other end. In this example, video and/or audio information from the camera 102 can be provided at the user device 108 substantially in real-time and audio and/or video information from the user device 108 can be played back using a speaker and/or display, respectively, if such devices are co-located with the camera 102.

Figure 2:
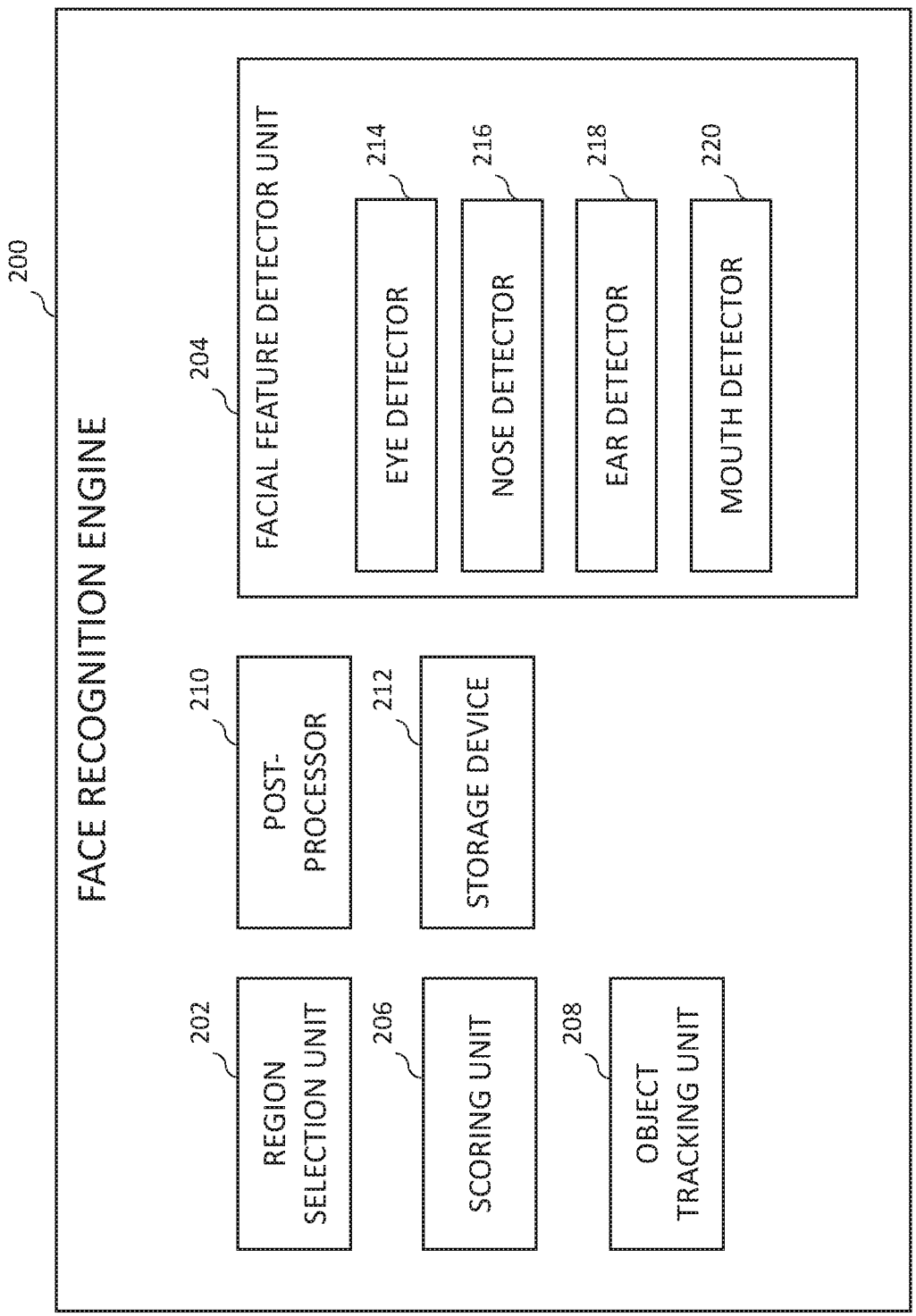
FIG. 2 illustrates generally an example of a face recognition engine.

FIG. 2 illustrates generally an example of a face recognition engine 200. The face recognition engine 200 can be implemented in whole or in part in one or more of the camera 102, the local server 104, the remote server 106, and the user device 108 from the system 100. That is, various functional aspects of the face recognition engine 200 can be performed at or in one of the devices, or can be distributed across multiple devices. In the example of FIG. 2, the face recognition engine 200 includes a region selection unit 202, a facial feature detector unit 204, a scoring unit 206, an object tracking unit 208, a post-processor 210 and a storage device 212. The facial feature detector unit 204 can further include an eye detector 214, a nose detector 216, an ear detector 218, a mouth detector 220, or other modules configured to detect various features or aspects of a human face that can be used in a recognition algorithm.

In an example, the face recognition engine 200 includes an input unit to receive an image input, such as frame-based image data. In an example, the input unit receives image information from one or more systems including the camera 102, the local server 104, or the remote server 106. The input unit can receive a video stream instead of an image and the video stream can be divided into a sequence of frames. In an example, the face recognition engine 200 is configured to remove noise from a received frame before further processing. The frames can be received by the face recognition engine 200 automatically at pre-defined intervals or irregularly. For example, the face recognition engine 200 can receive frames on demand, such as when an identification trigger is sent by, for example, a motion detector. In an example, frames can be received in response to a user or system request.

In an example, images are captured in real-time by the camera 102, and the images can be stored. The images as received can be in any suitable format for data analysis. The image can include objects such as human bodies, cars, trees, animals, buildings, any articles and so forth. Further, the images can include one or more regions that include non-human objects. Generally, regions that include or that may include a human face or facial feature can be referred to herein as a candidate region. A frame or image can have zero, one, or multiple candidate regions. In an example, a candidate region comprises all or a portion of a frame. That is, the candidate region can correspond to an entire field of view or less than an entire field of view.

In an example, the region selection unit 202 is configured to select one or more candidate regions from the one or more of regions in a frame based on a pre-defined threshold. The pre-defined threshold can indicate a probability of finding a human face, or a portion or part of a human face, in a region of the frame. In an example, candidate regions can include bounding boxes that are generated using machine learning-based detector algorithms. These algorithms run efficiently, quickly, and generate candidate regions with false positives that can generally be eliminated through further or more intensive processing.

In an example, the region selection unit 202 executes a region selection algorithm to select one or more candidate regions. The region selection algorithm can be biased to provide a low number of false negatives, meaning if a region includes a human face or feature, there is very low probability that the region will be rejected. In an example, the region selection algorithm can be biased to provide a high number of false positives, meaning if a region does not have a human face or feature, then the region can be selected. Various algorithms can be used for candidate region selection such as motion-based algorithms, simple HOG and SVM-based algorithms, and foreground pixels detection-based algorithms. After the one or more candidate regions are selected, then the selected regions can be provided to the facial feature detector unit 204 for further processing.

In an example, the facial feature detector unit 204 is configured to detect a human face in a candidate region of the one or more candidate regions based on various constraints, such as can include one or more sets of pair-wise constraints. The facial feature detector unit 204 can perform parts-based detection of the human face such as to identify facial features such as eyes, nose, ears, mouth, hair, or other attributes of a face or head region. In an example, the facial feature detector unit 204 includes a set of feature detectors for detecting respective parts of a head or face. For example, the facial feature detector unit 204 includes an eye detector 214, a nose detector 216, an ear detector 218, a mouth detector 220, or others. As evident from the names, the eye detector 214 is configured to detect locations or features of one or more eyes (e.g., size, placement, color, pupillary distance, etc.), the nose detector 216 is configured to detect size, placement, or other features of a nose, and so on.

In an example, the face recognition engine 200 and/or the facial feature detector unit 204 includes or uses Convolutional Neural Networks (CNN) to process image or frame data and provide an indication or classification of the information in the image or frame as comprising a face or being a face of a particular known or enrolled individual. In an example, a neural network used herein for face detection or analysis can use ResNet or DenseNet architectures, or others. The network can be configured to incorporate or use motion information, such as by analyzing information from multiple image frames over time, to provide a result with information about a presence or absence of a human face in a frame. In an example, the network can be configured to use angle or depth information about a candidate object in its determination or classification algorithms.

The neural networks discussed herein and the models employed in such networks can be trained using various data sources. For example, specific training data that corresponds to an end application or end user can be used to train the model employed by the network. The models can be specific to different use cases or environments or can be more general. In an example, a semi-supervised (semi-manual) process can be used to import learning data.

The neural networks discussed herein can be tuned to maximize power efficiency, such as using fixed-point calculations using weighted or output-quantized nodes. Generally, a network library footprint can be about 1 MB or less of data, however larger library files can be used when more resources (power, processing time) are available. Memory buffers used to perform the neural network-based analysis can be used and reused, that is, the buffers can be swapped throughout execution and are allocated only on demand. In an example, auxiliary hardware or accelerators can be used, such as to perform specific tasks like CV functions, matrix multiplication, CNN execution, and more.

In an example, the facial feature detector unit 204 detects a first facial feature at a first location in a candidate region using a first facial feature detector of the set of facial feature detectors. The first facial feature can be considered a root of a face, for example, eyes of a face. The facial feature detector unit 204 further detects a second facial feature at a second location in the candidate region using a second feature detector of the set of facial feature detectors. The second body part detector is selected from the set of facial detectors, and can be based on a pair-wise constraint. The pair-wise constraint can be determined based on a relative location of the second location with respect to the first location.

In an example, the facial feature detector unit 204 implements or uses fewer than all of the multiple available detectors, however, a decision of whether to apply one or more of the various available detectors can be condition-based. For example, the eye detector 214 can be applied first and if eyes are detected, such as eyes meeting a particular threshold condition, then other ones of the feature detectors 216-220 can be applied in appropriate regions, or portions of a frame, relative to the detected eyes. The condition-based implementation helps reduce a number of times the detectors are applied and can reduce processing time and power consumption. Further, a conditionally-applied body parts-based network of classifiers helps reduce a size of the network and provides better performance as compared to a full face or head-based classification network. Following identification of one or more facial features, information about the detected one or more body parts can be provided to the scoring unit 206 for further processing.

In an example, the scoring unit 206 can be configured to compute a score for a candidate region based on at least one of a first score and a second score. The first score corresponds to a score of the first facial feature and the second score corresponds to a score of the second facial feature. The first score can be determined based on the detection of the first facial feature at the first location and the second score can be determined based on the detection of the second facial feature at the second location. Based on the first score and the second score, an overall score can be computed for the detected face by the scoring unit 206. In an example, the overall score can be a summation of the first score and the second score. In another example, the overall score can be a weighted summation of the first score and the second score. In an example, the facial feature detector unit 204 can further implement one or more other facial feature or body part detectors, such as a torso detector or shoulder detector, until a complete or entire human upper body is detected. Based on the detected body parts, an overall score can be computed.

In an example, the object tracking unit 208 can be configured to track a head, face, body, or candidate region, across multiple frames. The tracking can be performed using techniques such as a MeanShift technique, an Optical Flow technique, a bounding box estimation technique, or other technique. In an example, a detected face can be tracked using the information contained in the current frame and one or more other adjacent (e.g., preceding or subsequent) frames. An object association or correspondence can be determined or provided for the detected objects in the different frames. In an example, a bounding box estimation process is executed, and the bounding box (or other shape containing the object) of an object in a current frame is compared with a bounding box in a previous frame(s) and a correspondence between the objects and/or bounding boxes to establish a cost function. The bounding box techniques can represent region and location information for an entire body or less than an entire body.

In an example, feature or model-based tracking can be used. According to this example, a pair of objects or features that includes a minimum value in a cost function can be selected by the object tracking unit 208. A bounding box of each tracked object can be predicted based on maximizing a metric in a local region. The prediction can be made using techniques such as, but not limited to, optical flow, mean shift, and/or dense-sampling search, and can be based on features such as HOG color, Haar features, and the like.

In an example, when object or feature tracking processing is complete, the object tracking unit 208 communicates with the post-processor 210 for further steps. The post-processor 210 can be configured to validate a detected face in the candidate region. The face can be validated based on at least one of a depth, a height and an aspect ratio of the face. In another example, the validation can be performed based on generic features such as color, HoG, SIFT, Haar, LBP, and the like. In an example, the validation can be performed using a region in a particular frame, using respective regions in multiple frames, or using full-frame analysis.

In an example, the storage device 212 can include a training database including pre-loaded human face images for comparison to a received image (e.g., image information received using the camera 102) during a detection process. The training database can include images of human faces in different positions and can include images of human faces having different sizes, shapes, genders, ages, hairstyles, clothing, facial adornments, and so on. In an example, the images can be positive image clips for positive identification of objects as human faces and can include negative image clips for positive identification of objects or non-human bodies.

In an example, the face recognition engine 200 and/or components thereof can be provided in the form of hardware components or software entities or modules that can be implemented using a generic or purpose-built processor. In an example, the face recognition engine 200 can be included in hardware or firmware of a camera, such as the camera 102, used to receive the image data, or can be included in a local or remote processing system. In an example, the face recognition engine 200 can be a part of at least one of a mobile phone, a computer, a server, or a combination thereof.

Figure 5:
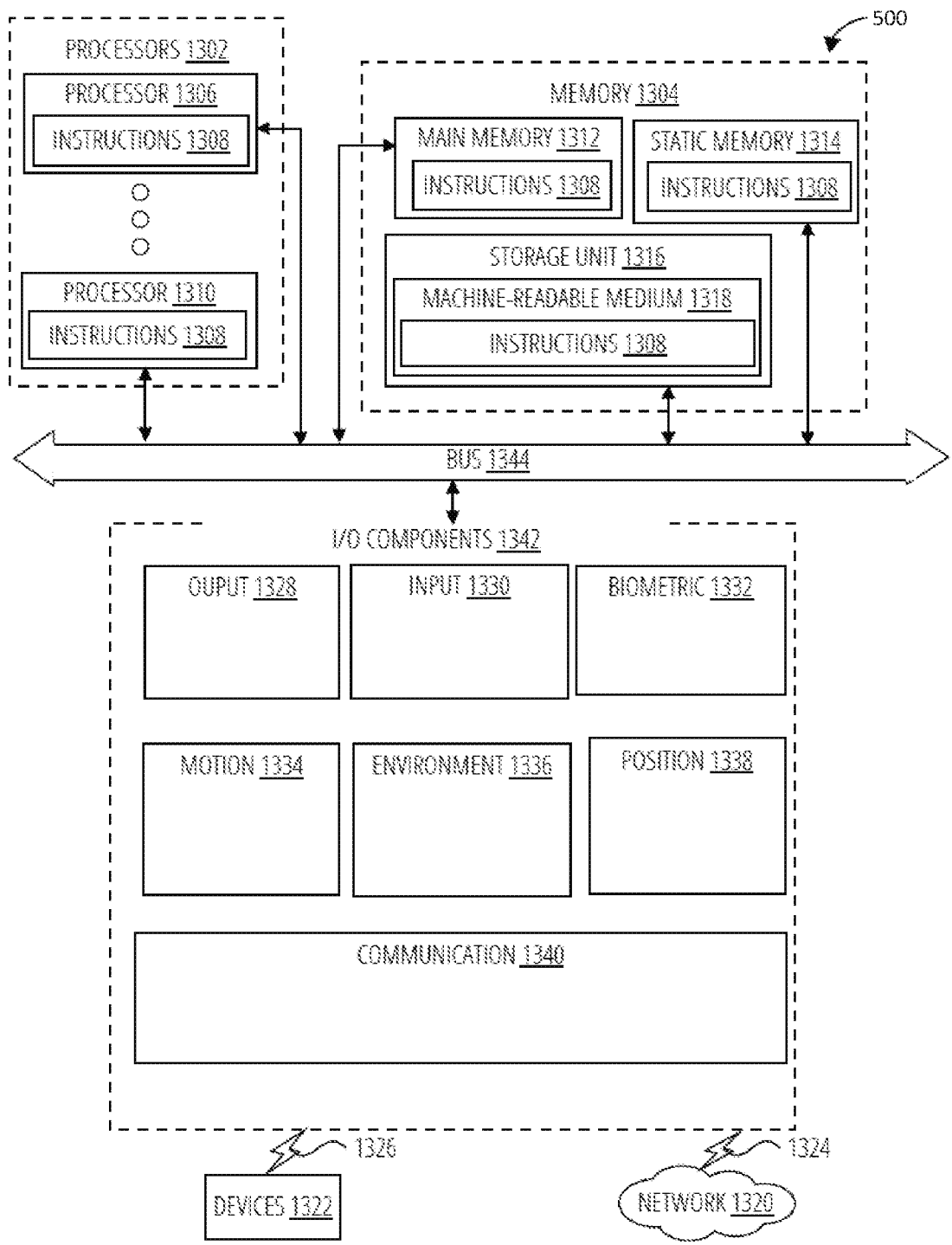
FIG. 5 illustrates generally an example of a machine in the form of a computer system within which a set of instructions can be executed to cause the machine to perform any one or more of the methods discussed herein.

Various algorithms, components, and processes for implementing human detection are discussed in U.S. Patent Application Publication No. 2017/0213081 ("the '081 publication"), titled "Methods and systems for automatically and accurately detecting human bodies in videos and/or images", which is hereby incorporated herein by reference in its entirety. Any one or more of the different algorithms, components, and processes in the '081 publication can similarly be applied in the context of the present application for the same or similar purpose of human identification in an image. For example, the '081 publication discusses using a Directional Weighted Gradient Histogram (DWGH) for detecting a human body in an image. The DWGH scheme can be used to provide better discrimination between positive and negative images. The '081 publication discusses using Latent Support Vector Machines (SVM) variables to improve detection accuracy. The '081 publication discusses enhancing processing speed and reducing false positives by using regions of detected motion and object tracking across frames. In FIG. 5, the '081 publication illustrates an exemplary method flowchart for detecting a body in an image based on a machine learning model including using deformable parts-based models for detecting human bodies, such as where one or more features are extracted for each part and are assembled to form descriptors based on pair-wise constraints. One or more of these features or aspects described in the '081 publication can be extended or applied to facial recognition.

Referring again to FIG. 2, the face recognition engine 200 can be implemented in whole or in part at or in hardware or software at or adjacent to a camera, such as in the camera 102. In an example, such implementation at a camera can be referred to as edge processing or edge-based processing. In an example, edge processing at a camera can be performed using machine learning models that are trained to work with an image in a YUV color space. In an example, edge processing can be performed using machine learning models that are trained to work exclusively on one element of a color space, such as using Y information only from a YUV color space. That is, in an example, color or chrominance information can be disregarded and brightness or luminance information can be used for image recognition processing. In an example, with less than all of YUV information being used by a processor, higher resolution analysis can be performed in a shorter amount of time or using fewer cycles than if all of the YUV information is used together.

In an example, the face recognition engine 200 includes a deep learning-based engine with anti-spoofing features. For example, the face recognition engine 200 can be configured to discriminate camera images of a person or people in an environment from a photograph presented to the camera where the photograph includes imagery of the same person or people. Such anti-spoofing can be critical for home or other security deployments such that an intruder cannot use a picture, e.g., of a homeowner, to enter monitored areas. Anti-spoofing processing by the face recognition engine 200 also allows for conventional, single lens 2D cameras to check for a real person being present.

Figure 3:
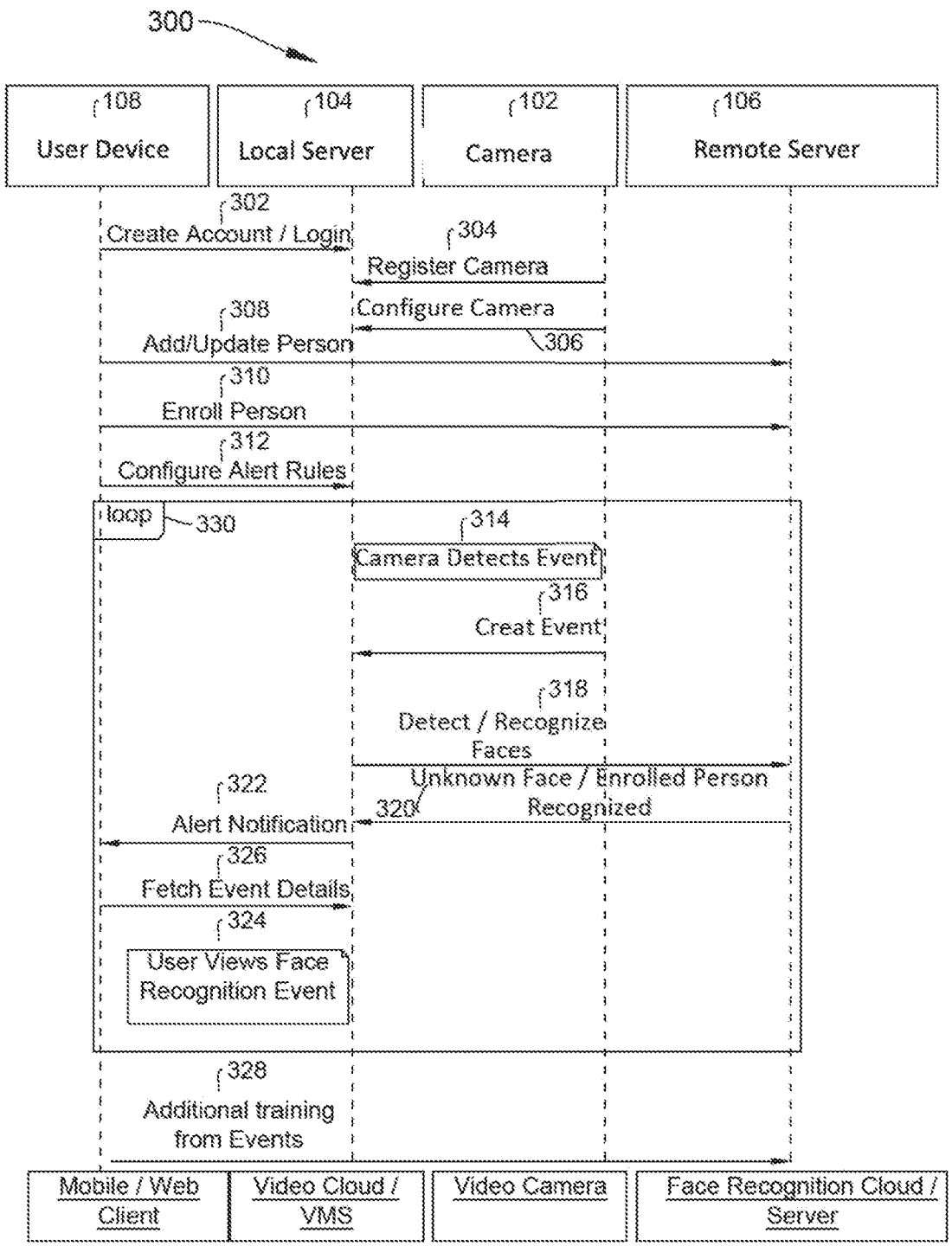
FIG. 3 illustrates generally an example of face recognition processing at a cloud server or local server.

FIG. 3 illustrates generally an example 300 of face recognition processing that includes or uses a server. The example 300 illustrates a series of steps for initializing the system 100 and performing face recognition. The particular series of steps is intended to be illustrative only and other sequences or orders of operations can be used.

At step 302, a user or system owner can create an account and/or log in to his or her account. The account can be maintained at the local server 104 or at the remote server 106; the example of FIG. 3, however, illustrates the account creation or log in at the local server 104. In the example of FIG. 3, the user device 108 is used to create the account or log in. The user device 108 can include an operating system that executes an application that provides a user interface for exchanging data with the local server 104 or the remote server 106. In an example, step 302 includes exchanging user credentials to authenticate the user.

In an example, a user registers with the system 100 using a mobile or web client application at step 302. The mobile or web client application can be or can provide a user interface for the system 100. The user interface can enable the user to register, configure the system, such as by enrolling one or more individuals, view live video, or view event details.

At step 304, following account creation and user log in, the user can register the camera 102. The registration can include linking a hardware or software address of the camera 102 with the user's account such that the user can access information from the camera or analytics derived by the camera 102 or a server about the information from the camera. At step 306, the example can include configuring the camera 102 and/or other sensors or features of the system 100. In an example, step 306 includes defining trigger events for later user notification, for data archiving, or other responsive action. For example, configuration at step 306 can include defining trigger events to correspond with sensed motion or activity or human presence or absence in a field of view of the camera 102.

At steps 308 and 310, the user can add or enroll individuals with the local server 104 or the remote server 106. At step 308, the example 300 can include adding personal attributes such as one or more of a name, age, date, employer, residence, or other information about an individual to be enrolled with the system 100.

At step 310, the example 300 can include receiving face information corresponding to the same individual. The face information can be received from various sources such as the camera 102, from a mobile device associated with the individual, from a database that includes a prerecorded video clip or image, from a camera integrated with another system such as a security system or security system control panel, a camera integrated with a doorbell, or other source of image information about the individual. In an example, the enrollment or training information received at step 310 can include face information about one individual and from multiple different sources or under different conditions such as different lighting, different angles, or different facial adornments. In an example, training using a live camera can include guiding or instructing a user or individual to-be-enrolled to place the subject (e.g., the face to enroll) at a proper or suitable distance or orientation.

At step 312, the user can configure alerts or rules that define when to issue an alert to the user or to another system or responder. In an example, the alerts or rules are established at the local server 104 or the remote server 106. An example can include a first rule that requires notification of the user any time a particular enrolled individual is detected by the system 100. An example can include a second rule that requires notification of the user when the particular enrolled individual is detected by the system 100 but only during particular hours, such as outside of normal business or daytime hours. An example can include a third rule that requires notification of the user when multiple enrolled individuals are detected by the system 100, or when multiple enrolled individuals are detected in a particular order or time sequence. The notification of the user can include providing a push notification to the user device 108, sending an email to the user, or archiving or storing information about a detected event or rules violation, among other actions that can be taken in response to satisfying or violating a rule.

In the example of FIG. 3, a loop 330 follows the various configuration or initialization steps 302-312. The loop 330 can be paused or interrupted to update configuration information for the system 100, or the loop 330 and various configuration updates can be performed concurrently. In an example, the loop 330 includes an event 314. In an example, the event 314 includes a motion event, a detected person event, a manually-triggered event, a doorbell ring, or other event. At step 316, the camera 102 can create or store information about the event 314. For example, the camera 102 can be configured to record or stream video information that corresponds in time with the event 314.

In the example of FIG. 3, video or image information about the event 314 is provided to the local server 104, and the local server 104 sends the image information to the remote server 106 at step 318 for further processing, such as using the face recognition engine 200 implemented at the remote server 106. The remote server 106 can apply machine learning-based algorithms to determine whether the image information includes a face that corresponds to an enrolled individual, or an enrolled class of individuals. At step 320, the remote server 106 can return a recognition result or recognition event to the local server 104.

Upon receipt of the recognition result by the local server 104, the local server 104 can apply one or more of the a priori rules to determine whether or how to respond, including whether or how to notify a user. At step 322, the example includes using the local server 104 to provide an alert or notification to the user based on the recognition result. In an example, at step 326, the example can include receiving an instruction from the user device 108 in response to the alert. The instruction from the user device 108 can include an instruction to retrieve additional information about the triggering event 314. For example, a user can use the user interface of the user device 108 to request a live video feed, or image or video information corresponding to the event 314, or image information corresponding to a recognized or unrecognized individual. In the example 300, the system 100 can respond by providing information 324 about the face recognition event. In an example, event data, such as from the event 314, can further be used in the example of FIG. 3 as additional training information. For example, the user can indicate, such as using the user device 108, that information corresponding to the event 314 represents a false positive or false negative. The user input can be shared with the remote server 106 and the face recognition engine 200. Such additional training can help the system 100 improve face recognition accuracy over time.

Figure 4:
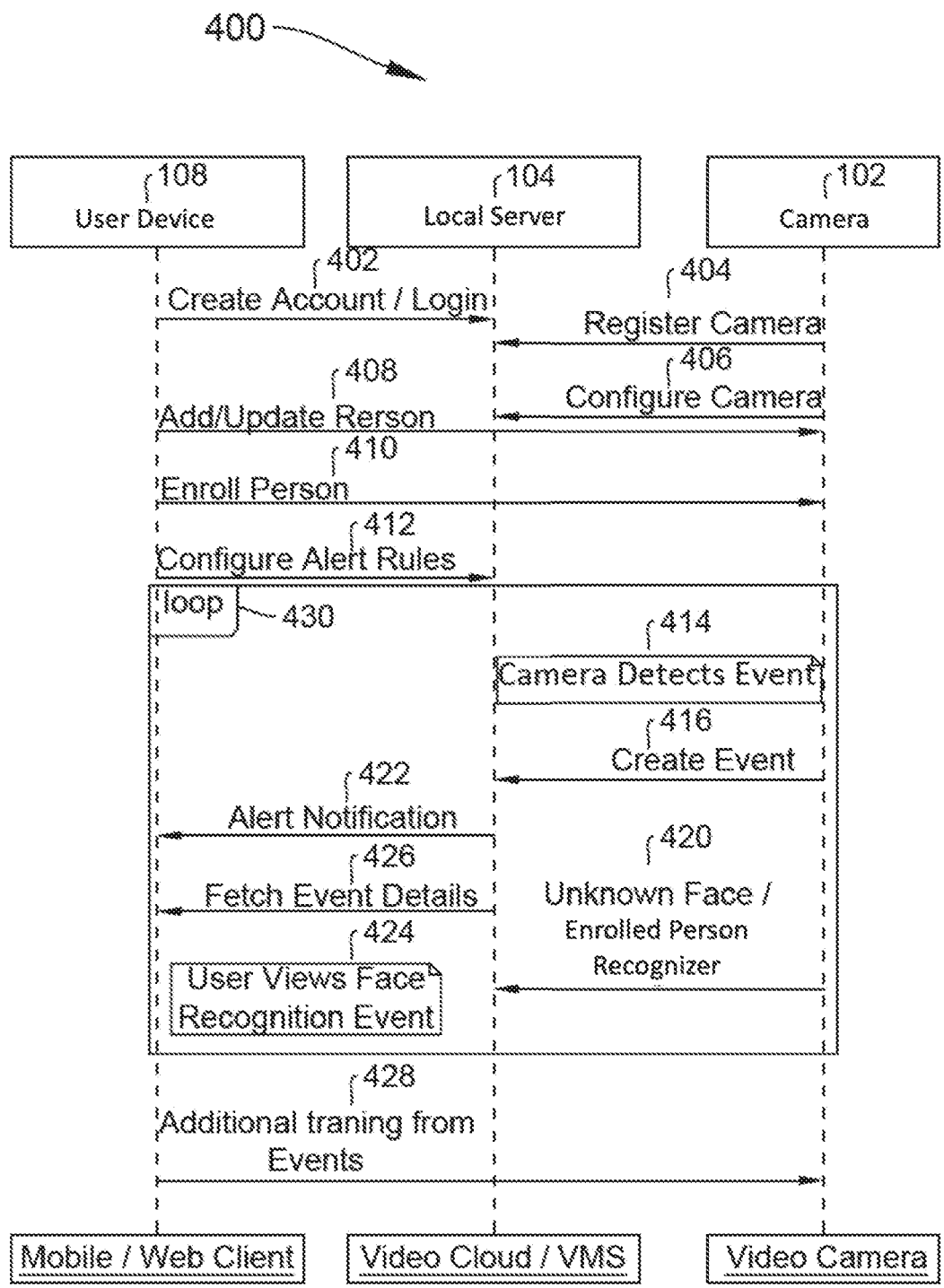
FIG. 4 illustrates generally an example of face recognition processing at an edge device.

FIG. 4 illustrates generally an example 400 of face recognition processing at an edge device. For example, the example 400 can include face recognition processing at the camera 102. That is, the example 400 can omit the remote server 106, which can help reduce latency or delays for face recognition events and user notification. The example 400 illustrates a series of steps for initializing the system 100 and performing face recognition. The particular series of steps is intended to be illustrative only and other sequences or orders of operations can be used.

Several of the steps in the example 400 of FIG. 4 correspond to like-numbered steps in the example 300 of FIG. 3. For example, at step 402, a user or system owner can create an account and/or log in to his or her account. The account can be maintained at the local server 104. In the example of FIG. 4, the user device 108 is used to create the account or log in. The user device 108 can include an operating system that executes an application that provides a user interface for exchanging data with the local server 104 and the camera 102. In an example, step 302 includes exchanging user credentials to authenticate the user.

In an example, a user registers with the system 100 using a mobile or web client application at step 402. The mobile or web client application can be or can provide a user interface for the system 100. The user interface can enable the user to register, configure the system, such as by enrolling one or more individuals, view live video, or view event details.

At step 404, following account creation and user log in, the user can register the camera 102. The registration can include linking a hardware or software address of the camera 102 with the user's account such that the user can access information from the camera or analytics derived by the camera 102 or a server about the information from the camera. At step 406, the example can include configuring the camera 102 and/or other sensors or features of the system 100. In an example, step 406 includes defining trigger events for later user notification, for data archiving, or other responsive action. For example, configuration at step 406 can include defining trigger events to correspond with sensed motion or activity or human presence or absence in a field of view of the camera 102.

At steps 408 and 410, the user can add or enroll individuals with the local server 104 or the remote server 106. At step 408, the example 400 can include adding personal attributes such as one or more of a name, age, date, employer, residence, or other information about an individual to be enrolled with the system 100.

At step 410, the example 400 can include receiving face information corresponding to the same individual. The face information can be received from various sources such as the camera 102, from a mobile device associated with the individual, from a database that includes a prerecorded video clip or image, from a camera integrated with another system such as a security system or security system control panel, a camera integrated with a doorbell, or other source of image information about the individual. In an example, the enrollment or training information received at step 410 can include face information about one individual and from multiple different sources or under different conditions such as different lighting, different angles, or different facial adornments. In an example, training using a live camera can include guiding or instructing a user or individual to-be-enrolled to place the subject (e.g., the face to enroll) at a proper or suitable distance or orientation.

At step 412, the user can configure alerts or rules that define when to issue an alert to the user or to another system or responder. In an example, the alerts or rules are established at the local server 104 or, optionally, in firmware of the camera 102. In an example, an alert result can include notification of the user such as by providing a push notification to the user device 108, sending an email to the user, or archiving or storing information about a detected event or rules violation, among other actions that can be taken in response to satisfying or violating a rule.

In the example of FIG. 4, a loop 430 follows the various configuration or initialization steps 402-412. The loop 430 can be paused or interrupted to update configuration information for the system 100, or the loop 430 and various configuration updates can be performed concurrently. In an example, the loop 430 includes an event 414. In an example, the event 414 includes a motion event, a detected person event, a manually-triggered event, a doorbell ring, or other event. At step 416, the camera 102 can create or store information about the event 414. For example, the camera 102 can be configured to record or stream video information that corresponds in time with the event 414 such as using the local server 104.

In an example, the loop 430 can begin in response to any event detected or triggered by the camera 102. For example, the camera 102 and/or the local server 104 can include a processor circuit configured to perform face recognition processing, such as using the face recognition engine 200. A result of the face recognition processing can include a recognition event. In an example, the camera 102 and/or the local server 104 can create the event 414, or the recognition event, in response to detecting or recognizing a face of an enrolled individual, detecting an unknown or unenrolled face, or other trigger such as indicated by another sensor such as a PIR motion sensor, a thermostat, a fire or smoke alarm sensor, an access control device or card reader, a door or entryway sensor, a garage or gate sensor, an acoustic sensor, a smart speaker, or others. In an example, the recognition event can include an indication of a recognition result and can include information such as the image used to generate the result, or characteristic information (e.g., name, age, sex, location, etc.) about an enrolled individual corresponding to the result.

In an example, the local server 104 includes the processor circuit and face recognition engine 200 for image analysis and for determining whether any rules are satisfied or violated. At step 422, the example includes using the local server 104 to provide an alert or notification to the user based on the recognition event or recognition result. In an example, at step 426, the example can include receiving an instruction from the user device 108 in response to the alert. The instruction from the user device 108 can include an instruction to retrieve additional information about the triggering event 414. For example, a user can use the user interface of the user device 108 to request a live video feed, or image or video information corresponding to the event 414, or image information corresponding to a recognized or unrecognized individual. In the example 400, the system 100 can respond by providing information 424 about the face recognition event.

In an example, event data, such as from the event 414, can further be used in the example of FIG. 4 as additional training information. For example, the user can indicate, such as using the user device 108, that information corresponding to the event 414 represents a false positive or false negative. The user input can be provided to the local server 104 and the face recognition engine 200. Such additional training can help the system 100 improve face recognition accuracy over time.

FIG. 5 illustrates generally an example of a machine 500 in the form of a computer system within which instructions 1308 can be executed to cause the machine to perform any one or more of the methods discussed herein. In an example, the machine 500 comprises a portion of the system 100, or one or more portions of the system 100 comprise an instance of the machine 500. The instructions 1308 can include software, a program, an application, an applet, an app, or other executable code that causes or configures the machine 500 to perform any one or more of the methods discussed herein, or portions of such methods. For example, the instructions 1308 can cause the machine 500 to execute any one or more of the methods described herein. The instructions 1308 transform a general, non-programmed machine into a particular machine configured or programmed to carry out the described and illustrated functions.

The machine 500 can operate as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 500. Further, while only a single machine 500 is illustrated, the term "machine" shall also be taken to include a collection of machines that individually or jointly execute the instructions 1308 to perform any one or more of the methodologies discussed herein.

The machine 500 can include processors 1302, memory 1304, and I/O components 1342, which can be configured to communicate with each other via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1306 and a processor 1310 that execute the instructions 1308. The term "processor" is intended to include multi-core processors that can comprise two or more independent processors (sometimes referred to as "cores") that can execute instructions contemporaneously. Although FIG. 5 shows multiple processors 1302, the machine 500 can include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 can also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 500.

The I/O components 1342 can include a wide variety of components to receive input, provide output, produce output, transmit information, exchange information, capture measurements, and so on. The specific I/O components 1342 that are included in a particular machine will depend on the type of machine. For example, portable machines such as mobile phones can include a touch input device or other such input mechanisms, while a headless server machine will likely not include such a touch input device. It will be appreciated that the I/O components 1342 can include many other components that are not shown in FIG. 5. In various example examples, the I/O components 1342 can include output components 1328 and input components 1330. In an example, the I/O components 1342 include the camera 102. The output components 1328 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 can include one or more cameras, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example examples, the I/O components 1342 can include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth.

The environmental components 1336 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 1338 can include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1342 further include communication components 1340 operable to couple the machine 500 to a network 1320 or devices 1322 via a coupling 1324 and a coupling 1326, respectively. For example, the communication components 1340 can include a network interface component or another suitable device to interface with the network 1320. In further examples, the communication components 1340 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 can be another machine or any of a wide variety of peripheral devices (e.g., a peripheral device coupled via a USB).

Moreover, the communication components 1340 can detect identifiers or include components operable to detect identifiers. For example, the communication components 1340 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1340, such as location via Internet Protocol (IP) geolocation, location via Wi-Fi® signal triangulation, location via detecting an NFC beacon signal that can indicate a particular location, and so forth.

The various memories (e.g., memory 1304, main memory 1312, static memory 1314, and/or memory of the processors 1302) and/or storage unit 1316 can store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 can be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 can be transmitted or received using a transmission medium via the coupling 1326 (e.g., a peer-to-peer coupling) to the devices 1322.

VARIOUS NOTES & EXAMPLES

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. An intelligent face recognition system for an installed security system, the face recognition system comprising:
   an enrollment and reporting device associated with a first user, wherein the enrollment and reporting device includes a first camera configured to receive imagery for enrolling faces with the system, and wherein the enrollment and reporting device is configured to receive an alert based on a recognition event and report the alert to the first user, and wherein the enrollment and reporting device is configured to receive a user-defined rule for providing the alert to the first user, wherein the rule indicates an order or time sequence in which multiple individuals are identified in candidate face information;
   one or more second cameras, other than the first camera and installed remotely from the enrollment and reporting device, configured to provide image information about a monitored environment; and
   a local or remote video processor including a face recognition engine, the video processor configured to:
      receive the imagery from the enrollment and reporting device to enroll faces with the system;
      receive the image information from the one or more second cameras, the image information including the candidate face information corresponding to multiple individuals other than the first user, and
      generate the alert for communication to the first user via the enrollment and reporting device, wherein the alert is based on the recognition event in the monitored environment and is based on satisfaction of the user-defined rule that indicates the order or time sequence in which the multiple individuals are identified in the candidate face information;
   wherein the face recognition engine is configured to apply machine learning to analyze the image information from the one or more second cameras and determine whether the image information includes or corresponds to enrolled faces of individuals other than the first user, and the enrolled faces are based on the imagery received by the enrollment and reporting device associated with the first user, and
   wherein the face recognition engine is configured to provide the recognition event based on the determination about whether the image information includes or corresponds to the enrolled faces.

2. The face recognition system of claim 1, wherein the enrollment and reporting device is configured to display, to the first user, real-time video information from the one or more second cameras in response to the recognition event.

3. The face recognition system of claim 1, wherein the enrollment and reporting device is configured to display, to the first user and in response to a request from the user, an image used by the video processor in generating the alert based on the recognition event.

4. The face recognition system of claim 1, wherein the face recognition engine is configured to apply the machine learning to analyze the image information from the one or more second cameras in response to a motion event detected using information from the same one or more second cameras or from a different motion sensor.

5. The face recognition system of claim 1, further comprising an indoor/outdoor camera apparatus comprising the one or more second cameras and the video processor including the face recognition engine.

6. The face recognition system of claim 1, wherein the video processor is configured to generate the alert based on the recognition event and based on an environment change as indicated by information from another sensor or device, including one or more of a motion sensor, a thermostat, a fire alarm, a smoke alarm, an access control device, an acoustic sensor, a doorbell, a relay, or a smart speaker.

7. The face recognition system of claim 1, wherein the face recognition engine includes a condition-based face detector that is configured to use respective threshold conditions for different facial feature detectors to expedite analysis and reduce a number of false positive results.

8. The face recognition system of claim 1, wherein the user device associated with the first user is configured to receive imagery of the face of the individual other than first user to enroll the face with the system.

9. The face recognition system of claim 1, wherein the alert for communication to the first user comprises a report with information about when the enrolled face of the individual other than first user was detected by the system.

10. The face recognition system of claim 1, wherein the user device comprises an interface configured to display a timeline of events including an indication of when an enrolled face is identified in the image information from the one or more cameras.

11. A machine learning-based image recognition system comprising:
a user device associated with a first user, wherein the user device is configured to report recognition alerts to the first user and the user device includes a first camera configured to receive face images for enrolling faces with the system, the face images belonging to individuals who are other than the first user;
an image receiver, other than the first camera, configured to receive a series of image frames of an environment, wherein each of the image frames is acquired at a different time; and
a neural network-based face recognition processor circuit configured to:
access a database of facial features, the facial features corresponding to the face images received by the user device and the facial features belonging to the individuals who are other than the first user;
identify multiple candidate faces present in the image frames from the image receiver, wherein the multiple candidate faces correspond to the individuals who are other than the first user;
determine whether the multiple candidate faces adhere to a user-defined rule about an order or time sequence in which the multiple candidate faces are identified;
and
generate a recognition alert, for communication to the first user via the user device, about whether the user-defined rule is satisfied.

12. The system of claim 11, further comprising an indoor/outdoor camera device comprising the image receiver and the neural network-based face recognition processor circuit.

13. The system of claim 11, wherein the user device is configured to receive the alert and, based on a response from the first user to the alert, provide information to the first user about the candidate face or about an enrolled individual corresponding to the candidate face.

14. The system of claim 11, wherein the image receiver comprises a camera that comprises a portion of a home or office security system.

15. The system of claim 11, further comprising a non-camera sensor configured to sense information about the environment, and wherein the image receiver is configured to receive the series of image frames of the environment when the information from the non-camera sensor indicates a deviation from a normal environment condition.

16. The system of claim 15, wherein the non-camera sensor includes a motion sensor, and wherein the image receiver is configured to receive the series of image frames of the environment when the motion sensor indicates motion is detected in the environment, and wherein the system includes a processor circuit configured to determine the deviation from the normal environment condition by automatically learning about events in the environment over time.

17. A method for performing facial recognition using a local or distributed processing system, the method comprising:
using a first camera of a first device associated with a first user, receiving imagery for enrolling faces with the system;
receiving, at the first device, a user-defined rule for providing an alert to the first user, wherein the rule indicates an order or time sequence in which multiple individuals are identified in candidate face information received from a different second camera;
receiving the candidate face information from the different second camera, the candidate face information corresponding to the multiple individuals, who are other than the first user, and the second camera installed remotely from the first device associated with the first user;
providing the candidate face information to a neural network-based face recognition processor;
accessing a database of facial features corresponding to the faces enrolled with the system by the first device; and
responsive to determining the candidate face information corresponds to faces enrolled with the system by the first device, and responsive to determining the rule is satisfied or violated, generating an alert, for communication to the first user via the first device, about the satisfaction or violation of the rule.

18. The method of claim 17, wherein the determining the candidate face information corresponds to faces enrolled with the system includes using the candidate face information as an input to a convolutional neural network that is trained on the database of facial features corresponding to the faces enrolled with the system.

19. The method of claim 18, further comprising receiving training information for the neural network from a user input in response to the generated alert, the training information including an indication received from the first device about a validity of the alert.

* * * * *